United States Patent
Jacobs et al.

(10) Patent No.: US 7,929,991 B2
(45) Date of Patent: *Apr. 19, 2011

(54) MOBILE DEVICE INTERFACE FOR INPUT DEVICES

(75) Inventors: Paul E. Jacobs, La Jolla, CA (US); George Alan Wiley, San Diego, CA (US); Franklin Peter Antonio, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 393 days.

This patent is subject to a terminal disclaimer.

(21) Appl. No.: 11/277,916

(22) Filed: Mar. 29, 2006

(65) Prior Publication Data
US 2006/0223581 A1    Oct. 5, 2006

Related U.S. Application Data

(60) Provisional application No. 60/667,416, filed on Mar. 31, 2005.

(51) Int. Cl.
*H04B 1/38* (2006.01)
*H04M 1/00* (2006.01)
(52) U.S. Cl. ........ 455/557; 455/556.1; 455/556.2; 455/575.2; 455/575.6
(58) Field of Classification Search ......... 455/557, 455/556.1, 556.2, 412.1, 413, 575.2, 575.6
See application file for complete search history.

(56) References Cited

U.S. PATENT DOCUMENTS

| | | | | |
|---|---|---|---|---|
| 6,038,457 A | * | 3/2000 | Barkat | 455/556.1 |
| 6,775,557 B2 | * | 8/2004 | Tsai | 455/556.1 |
| 2003/0144040 A1 | * | 7/2003 | Liu et al. | 455/568 |
| 2004/0041911 A1 | * | 3/2004 | Odagiri et al. | 348/207.1 |
| 2004/0192238 A1 | * | 9/2004 | Kasami et al. | 455/130 |
| 2004/0198233 A1 | * | 10/2004 | Pratt et al. | 455/67.11 |

FOREIGN PATENT DOCUMENTS

| | | |
|---|---|---|
| JP | 11305922 A | 11/1999 |
| JP | 2000286936 A | 10/2000 |
| JP | 200227045 A | 1/2002 |
| KR | 1020020044438 | 6/2002 |
| WO | WO 9610450 A1 * | 4/1996 |
| WO | WO0042797 A | 7/2000 |

OTHER PUBLICATIONS

International Search Report—PCT/US06/011473, International Search Authority, United States—Mar. 19, 2008.
Written Opinion—PCT/US06/011473, International Search Authority, United States—Mar. 19, 2008.
International Preliminary Report on Patentability, PCT/US06/011473, The International Bureau of WIPO, Geneva, Switzerland, Sep. 23, 2008.
International Search Report and Written Opinion—PCT/US06/11743, International Search Authority—United States—Mar. 19, 2008.

* cited by examiner

*Primary Examiner* — Tuan A Pham
(74) *Attorney, Agent, or Firm* — James T. Hagler

(57) ABSTRACT

A mobile electronic device includes an earphone/microphone port, an I/O circuit to receive a modulated data signal from data input devices via the earphone/microphone port, and a processor unit programmed to extract data from the modulated data signal. The processor unit (or the I/O circuit) detects connection of a device to an earphone/microphone connector of the mobile electronic device and determines whether the connected device is a data input device. If the connected device is a data input device, the processor unit is programmed to extract data from modulated data signals generated by data input device.

38 Claims, 3 Drawing Sheets

MOBILE DEVICE INTERFACE FOR INPUT DEVICES

CROSS-REFERENCE TO RELATED APPLICATIONS

This application claims the benefit of U.S. Provisional Application No. 60/667,416 filed Mar. 31, 2005. The contents of these documents are incorporated herein by reference.

BACKGROUND

Field of the Invention

Various embodiments described below relate generally to mobile communication and like devices such as wireless telephones, and more particularly but not exclusively to input device interfaces used in mobile communication and like devices.

Currently-available mobile communication devices (such as wireless telephones) may include a built-in input device (e.g., a keypad) to allow a user to input alpha-numeric data. Due to the limited size of such mobile devices, the input device is often relatively small, which can be difficult and/or slow to use for a typical user.

In addition, currently-available mobile devices typically include an earphone/microphone interface. A conventional earphone/microphone interface can allow a user to connect an external earphone/microphone assembly (e.g., a headset) to the mobile device. Many such interfaces use a standard earphone/microphone socket connector that accepts a standard plug. This connection is used to propagate analog electrical signals between the earphone/microphone assembly and the mobile device.

SUMMARY

The paragraphs that follow represent a summary to provide a basic understanding of various aspects of the invention. The summary is not an exhaustive or limiting overview of the disclosure. Further, the summary is not provided to identify key and/or critical elements of the invention, delineate the scope of the invention, or limit the scope of the invention in any way.

According to one of the aspects of the various embodiments, a method for receiving data in a mobile electronic device from a data input device is provided. The method includes detecting connection of a device to an earphone/microphone connector of the mobile electronic device. The method also includes determining whether the connected device is a data input device and, if the connected device is a data input device, extracting data from modulated data signals generated by data input device. In a related aspect, machine-executable instructions for performing this method can be stored on a machine-readable medium.

By using the earphone/microphone port to receive data from the data input device, the mobile electronic device can advantageously eliminate the need for a separate and/or dedicated connector for the data input device. Further, because earphone/microphone connectors are standard in many mobile electronic devices, the input device can be compatible with many mobile electronic devices.

In another aspect, an apparatus for receiving data in a mobile electronic device from an external data input device is provided. The apparatus includes an earphone/microphone port, which is compatible with some earphone/microphone assemblies. In addition, data input devices are implemented with connectors that are compatible with the earphone/microphone port. The apparatus also includes an input/output (I/O) circuit to receive a modulated data signal from data input devices via the earphone/microphone port; and a processor unit programmed to extract data from the modulated data signal.

In still another aspect, a system for receiving data in a mobile electronic device from an external data input device via an earphone/microphone port of the mobile electronic device is provided. The system includes a device discrimination component that can determine whether a device connected to the earphone/microphone port is a data input device. The system also includes a device interface component that can extract data from a modulated data signal generated by a data input device connected to the earphone/microphone port. In a related aspect, the components of this system can be implemented as software components and stored on a machine-readable medium.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

The following techniques and mechanisms are directed to implementing methods and components of mobile electronic device to interoperate with an input device via a standard earphone/microphone connector. In general, the mobile electronic device includes an interface to support data transfer between the mobile electronic device and the input device via the standard earphone/microphone connector. This interface can be implemented in hardware and/or software. Specific implementations of this general concept are described below.

Figure 1:
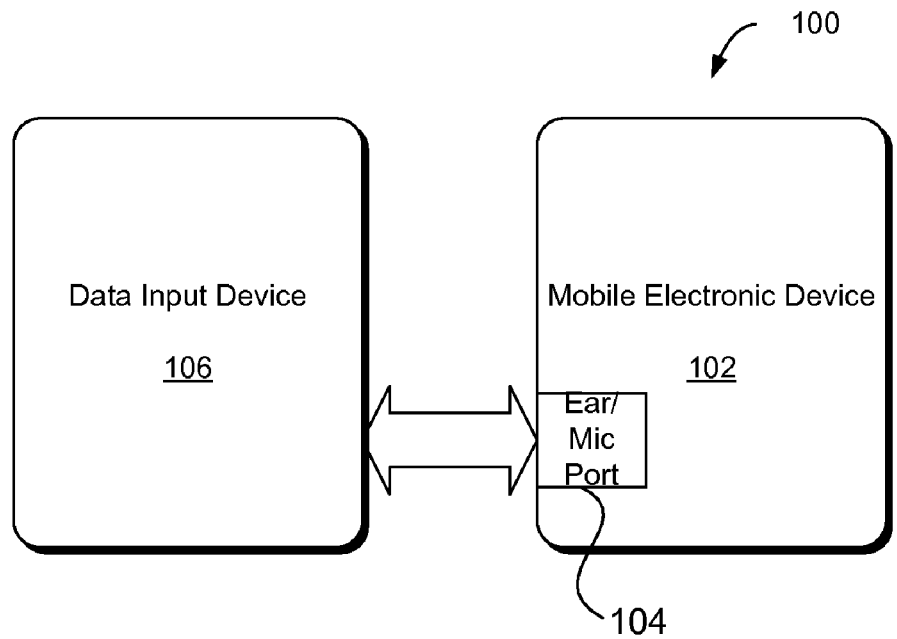
FIG. 1 is diagram generally illustrating a system that includes a mobile electronic device and an input device that are connected via an earphone/microphone connector, according to one embodiment of the invention.

FIG. 1 generally illustrates a system 100 that includes two main components; namely a mobile electronic device 102 with an earphone/microphone connector 104 and a data input device 106. Mobile electronic device 102 can be connected to data input device 106 via earphone/microphone connector 104. In this embodiment, mobile electronic device 102 is a wireless telephone and earphone/microphone connector 104 is a standard connector used in many currently-available mobile electronic devices. Data input device 106 can be any input device that outputs a modulated data signal compatible with the circuitry of mobile electronic device 102. In one embodiment, data input device 106 is a keyboard. In accordance with embodiments of the invention, mobile electronic device 102 includes an interface that can extract the data modulated on the electrical signal received via earphone/microphone connector 104.

By interoperating with data input device 106 via earphone/microphone connector 104, mobile electronic device 102 can advantageously eliminate the need for a separate and/or dedicated connector for the data input device, thereby reducing complexity and cost of the mobile electronic device. Further, because earphone/microphone connectors are standard in many mobile electronic devices, data input device 106 can be compatible with many mobile electronic devices. In contrast, data ports available on some mobile electronic devices are typically different for each manufacturer and/or model. Using such data ports would require the data input device manufacturer to provide many different implementations, which tends to result in higher costs in fabricating the data input devices.

Although a wireless telephone/keyboard system is described, in other embodiments, mobile electronic device 102 may be another type of mobile device such as, for example, a personal digital assistant (PDA), global positioning system (GPS) receiver, music players (e.g., MP3 players), etc. Similarly, data input device 106 may be another data input device such as, for example, a handwriting recognizer (such as in a tablet PC).

Figure 2:
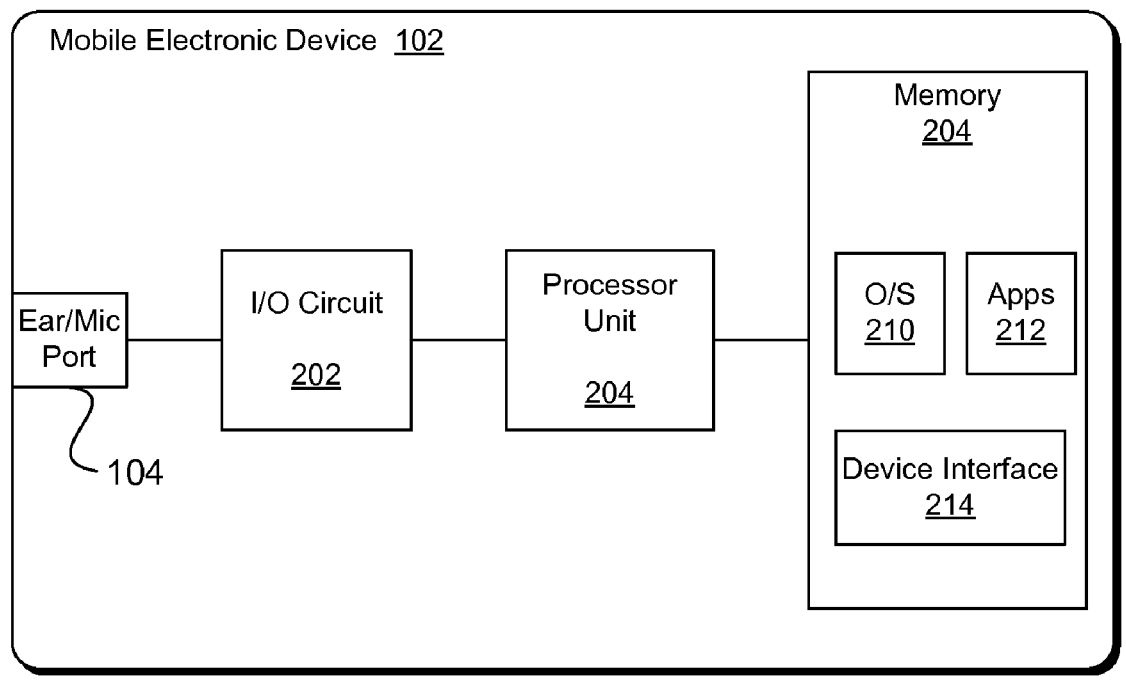
FIG. 2 is a functional block diagram generally illustrating a portion of the mobile electronic device of FIG. 1, according to one embodiment of the invention.

FIG. 2 generally illustrates a portion of mobile electronic device 102 (FIG. 1) used in implementing an interface with data input device 106 (FIG. 1), according to one embodiment of the invention. Other portions of mobile electronic device 102 (e.g., display, keypad, radio frequency (RF) units, etc.) are omitted from FIG. 2 for clarity. In this embodiment, this portion of mobile electronic device 102 includes an input/output (I/O) circuit 202, a processor unit 204 (that can include a general purpose processor, a specialized communications processor and/or a digital signal processor), and a memory 206. In this embodiment, memory 206 is used to store an operating system 210, one or more applications 212, and a device interface 214, which are to be executed by the processor unit.

I/O circuit 202 is connected to earphone/microphone connector 104 and may include resistive line terminations, I/O buffers, input lines (used to carry electrical signals generated by the microphone of an earphone/microphone assembly) and output lines (used to carry electrical signals to the earphone of the earphone/microphone assembly) as in an I/O circuit for conventional earphone/microphone circuitry.

However, in accordance with some embodiments of the present invention, the input and output lines (not shown) of I/O circuit 202 can also carry input and output signals for data input device 106 (FIG. 1). In some embodiments, different buffers and shielding are used as compared to those used only for interfacing with earphone/microphone assemblies.

In some embodiments, I/O circuit 202 may include a filter circuit to filter modulated data signals from data input devices (such as data input device 106 of FIG. 1), designed to pass both voice modulated signals and signals modulated with digital data. In some other embodiments, I/O circuit 202 may also include circuitry to determine whether a device connected to earphone/microphone connector 104 is a data input device 106 (as opposed to an earphone/microphone assembly).

Although hardware implementations are described above for some functions of I/O circuit 202, in some other embodiments one or more of these functions may be implemented in software to be executed by processor unit 204.

Processor unit 204 may be implemented using any suitable processor or processors. As previously mentioned, such processors include general purpose processors, specialized communications processors and/or digital signal processors. In some embodiments, processor unit 204 includes one or more model QDSP400 digital signal processing cores available from Qualcomm, Inc., San Diego, Calif., and one or more model ARM926EJ-S processor cores available from ARM, Ltd, Cambridge, UK.

Memory 206 is typically implemented using both volatile and non-volatile memory devices. As previously mentioned, memory 206 can be used to store operating system 210, one or more applications 212, and device interface 214, as well as other modules, data structures, drivers, etc. Device interface 214, in accordance with embodiments of the invention, extracts data modulated on an electrical signal received from data input device 106 (FIG. 1) via earphone/microphone connector 104 and I/O circuit 202. Data input device 106 can use any suitable modulation scheme to modulate the data onto an electrical signal, with device interface 214 implementing the corresponding demodulation scheme to extract the data. For example, in some embodiments, an On/Off Keying (OOK) modulation scheme is used to provide a low-power implementation. In other applications, M-ary modulation schemes can be used. For example, in embodiments in which data input device 106 is a keyboard, an M-ary modulation scheme can be used so that each character of the keyboard (which are typically mapped to a multi-bit scan codes) can be represented by a single symbol of the M-ary modulation scheme.

In an example scenario, a user can launch an application 212 that requires alpha-numeric data from the user (e.g., a "phonebook" application that can store contact information). In this scenario, the user can connect data input device 106 (a keyboard in this scenario) to mobile electronic device 102 (a wireless telephone in this scenario) via earphone/microphone connector 104 to input the contact information. The keyboard has a built-in interface (or the interface can be implemented in a separate adapter) to modulate keyboard data (e.g., alpha numeric characters) onto a data signal that can be propagated to mobile electronic device 102. The wireless telephone receives the modulated signal via I/O circuit 202. The modulated signal is then processed by device interface 214 to demodulate the keyboard data. The application 212 can then receive the demodulated data from device interface 214.

Figure 3:
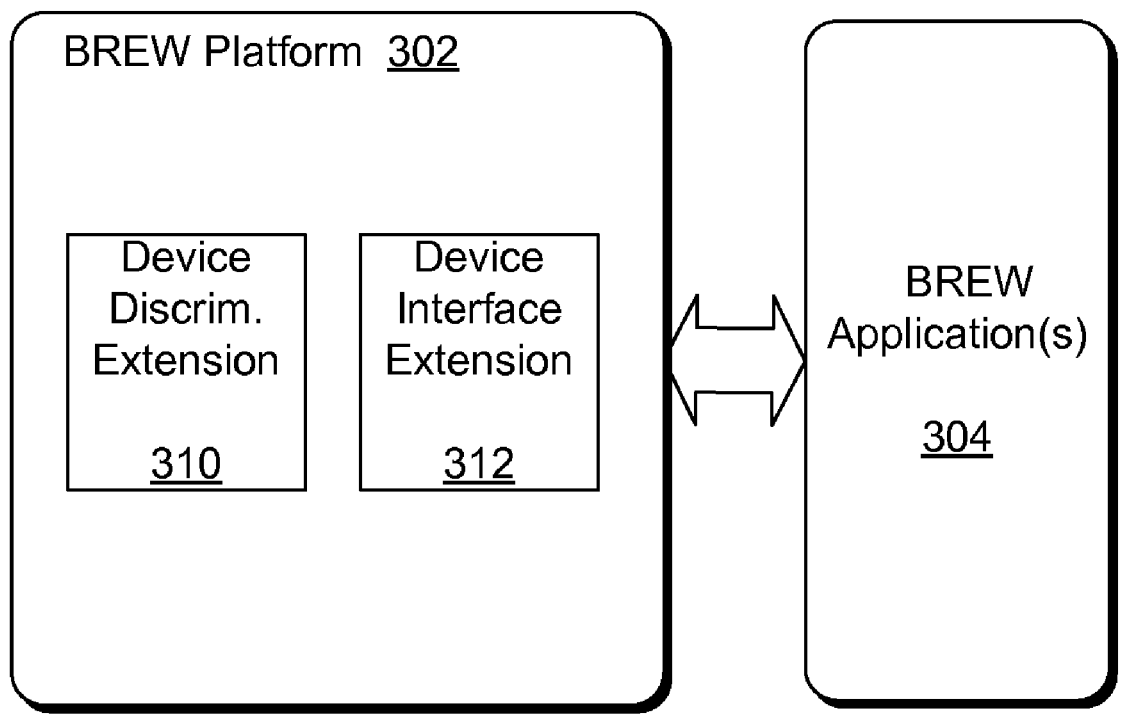
FIG. 3 is a block diagram generally illustrating a software platform used in implementing an interface in the mobile electronic device of FIG. 1 to interoperate with the input device of FIG. 1, according to one embodiment of the invention.

FIG. 3 generally illustrates portion of a software platform 302 with extensions that are used in implementing device interface 214 (FIG. 2) to interoperate with data input device 106 (FIG. 1), according to one embodiment of the invention. This software platform can also be used by processor unit 204 (FIG. 2) of mobile electronic device 102 (FIG. 1) to support applications (e.g., applications 212). In this example embodiment, software platform 302 is the Binary Runtime Environment for Wireless (BREW) platform, available from the aforementioned Qualcomm, Inc., that support one or more BREW applications 304 that require input data. In this embodiment, BREW platform 302 includes a device discriminator extension 310 and a device interface extension 312 that a BREW application 304 can use to support data transfer from data input device 106 (FIG. 1).

Device discriminator extension 310, in this embodiment, is implemented to determine when a device is connected to mobile electronic device 102 and, unlike conventional mobile electronic devices, to determine whether the connected device is a data input device 106 (rather than an earphone/microphone assembly). For example, in one embodiment, the device connection operation can be performed in a conventional manner. Once a device connection is detected, device discriminator extension 310 can then perform a handshaking process or interrogation process to determine whether the connected device is a data input device 106. A data input device 106 would include components or modules that support such handshaking or interrogation processes.

Device interface extension 312, in this embodiment, is implemented to demodulate the modulated data signal received from a data input device 106 and provide the data to a BREW application 304 as previously described for device interface 214 (FIG. 2). In one embodiment, this demodulation function can be implemented using a digital signal processor (DSP) or DSP core suitable programmed with a suitable demodulation scheme. In some embodiments, device interface extension 312 can also cause the alphanumeric keys of the mobile electronic device's built-in data input device (e.g., a keypad) to be disabled or ignored so that the application will only receive alphanumeric data inputted via data input device 106.

Although BREW-based embodiments are described above, other embodiments can be implemented using other environments such as, for example, JAVA implementations.

Figure 4:
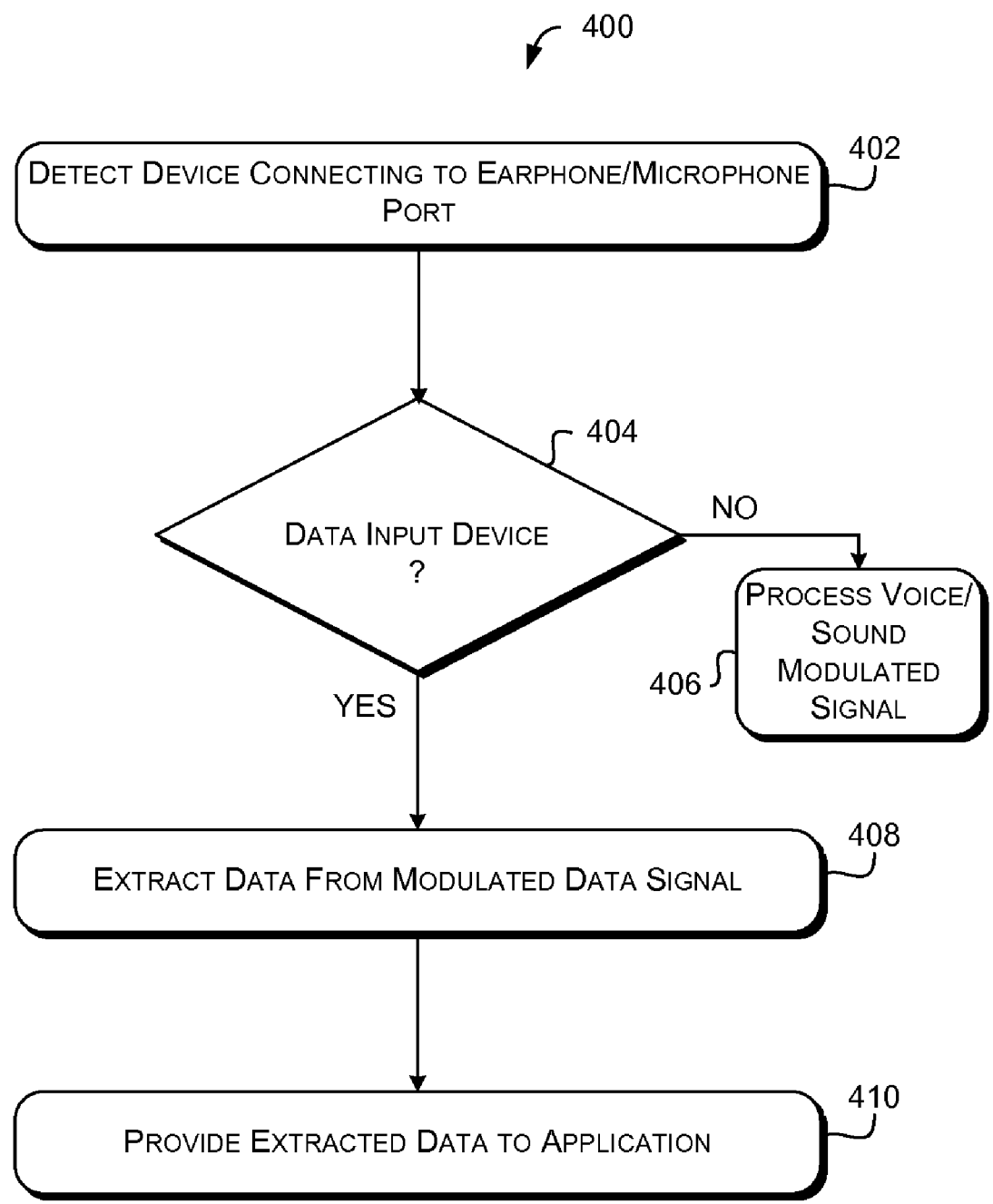
FIG. 4 is a flow diagram generally illustrating operational flow of a mobile electronic device in receiving data from an input device, according to one embodiment of the invention.

FIG. 4 is a flow diagram generally illustrating a process 400 performed by a mobile electronic device in receiving data from a data input device, according to one embodiment of the invention. In some embodiments, process 400 is performed by mobile electronic device 102 (FIGS. 1 and 2), although in other embodiments other mobile electronic devices can be used. Consequently, although the following description of process 400 may mention components of mobile electronic device 102, process 400 is not intended to be limited to performance by mobile electronic device 102.

At a block 402, the mobile electronic device operates to detect whether another device is connected to the mobile electronic device via its earphone/microphone connector (e.g., earphone/microphone connector 104 of FIGS. 1 and 2). In one embodiment, the mobile electronic device may include a component that operates as described above for device discrimination extension 310 (FIG. 3). The operation continues until a device connection is detected, at which point the operational flow proceeds to a decision block 404.

At decision block 404, the mobile electronic devices operates to determine whether the detected device is a data input device (e.g., data input device 106 of FIG. 1), as opposed to an earphone/microphone assembly. If the detected device is an earphone/microphone assembly, the operational flow proceeds to a block 406 in which voice (or sound) modulated data signals propagated to the mobile electronic device are processes as in conventional wireless telephones. In one embodiment, the mobile electronic device may include a component that operates as described above for device discrimination extension 310 (FIG. 3). If the detected device is a data input device, the operational flow proceeds to a block 408.

At block 408, data is extracted from modulated data signals generated by the data input device. In some embodiments, the mobile electronic device includes a demodulator (can be software or hardware) to demodulate the received modulated data signal. For example, the mobile electronic device can include a software demodulator implemented by a DSP device.

At a block 410, the extracted data is provided to an application. For example, in a BREW enabled wireless telephone embodiment, the wireless telephone may include a component similar to device interface extension 312 to both extract the data and provide the extracted data to a BREW application that requires data input from the user.

Although the operational flow of process 400 is described sequentially, in some embodiments the operations of the various blocks may be performed in different orders, multiple times, and/or in parallel.

Various modules and techniques may be described herein in the general context of computer-executable instructions, such as program modules, executed by one or more processors or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of machine-readable media. Machine-readable media can be any available media that can be accessed by a mobile electronic device. By way of example, and not limitation, machine-readable media may comprise "machine storage media" and "communications media."

"Machine storage media" includes volatile and non-volatile, removable and non-removable media implemented in any method or technology for storage of information such as machine readable instructions, data structures, program modules, or other data. Machine storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a mobile electronic device.

"Communication media" typically embodies machine readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that embodiments of the invention may be practiced without one or more of the specific details, or with other methods, resources, materials, etc. In other instances, well known structures, resources, or operations have not been shown or described in detail merely to avoid obscuring aspects of various embodiments of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A method for receiving data in a mobile electronic device from a data input device, the method comprising:

detecting connection of a device to an earphone/microphone connector of the mobile electronic device with a device discriminator extension of a software platform of the mobile electronic device;
automatically determining whether the connected device is a data input device with the device discriminator extension; and
extracting data from a modulated data signal generated by the data input device with a device interface extension of the software platform in response to the device discriminator extension determining the connected device is a data input device,
wherein:
the data input device transmits data along a same circuit path as an earphone/microphone unit, and
the mobile electronic device uses a single interface to extract the modulated data signal and to extract an earphone/microphone signal.

2. The method of claim 1, further comprising the device interface extension providing the extracted data to an application running on the mobile electronic device.

3. The method of claim 1, wherein data input device is a keyboard.

4. The method of claim 1, wherein the modulated data signal is modulated using an ON/OFF keying (OOK) modulation scheme.

5. The method of claim 1, wherein the modulated data signal is modulated using an M-ary modulation scheme so that each symbol defined in the modulation scheme represents a unique alpha numeric character.

6. The method of claim 1, further comprising the device discriminator extension disabling a built-in input device of the mobile electronic device in response to the device discriminator extension determining the connected device is a data input device.

7. The method of claim 1, wherein the mobile electronic device comprises a wireless telephone.

8. A non-transitory machine-readable storage medium having stored thereon processor-executable instructions comprising a software platform of the mobile electronic device including a device discriminator extension and a device interface extension, wherein the processor-executable instructions are configured to cause a mobile electronic device processor to perform operations comprising:
detecting connection of a device to an earphone/microphone connector of a mobile electronic device with the device discriminator extension of the software platform of the mobile electronic device;
automatically determining whether the connected device is a data input device with the device discriminator extension; and
extracting data from a modulated data signal generated by the data input device with the device interface extension of the software platform in response to the device discriminator extension determining the connected device is a data input device,
wherein:
the data input device transmits data along a same circuit path as an earphone/microphone unit, and
the mobile electronic device uses a single interface to extract the modulated data signal and to extract an earphone/microphone signal.

9. The non-transitory machine-readable storage medium of claim 8, wherein the operations further comprise the device interface extension providing the extracted data to an application running on the mobile electronic device.

10. The non-transitory machine-readable storage medium of claim 8, wherein the data input device is a keyboard.

11. The non-transitory machine-readable storage medium of claim 8, wherein the modulated data signal is modulated using an ON/OFF keying (OOK) modulation scheme.

12. The non-transitory machine-readable storage medium of claim 8, wherein the modulated data signal is modulated using an M-ary modulation scheme so that each symbol defined in the modulation scheme represents a unique alpha numeric character.

13. The non-transitory The machine-readable storage medium of claim 8, wherein the operations further comprise the device discriminator extension disabling a built-in input device of the mobile electronic device in response to the device discriminator extension determining the connected device is a data input device.

14. The non-transitory machine-readable storage medium of claim 8, wherein the mobile electronic device comprises a wireless telephone.

15. An apparatus for receiving data in a mobile electronic device from an external data input device, the apparatus comprising:
an earphone/microphone port coupleable to a data input device;
an input circuit;
a processor unit programmed with a software platform comprising:
a device discriminator extension of the software platform of the mobile electronic device configured to automatically determine the data input device is to be used for input and receive a modulated data signal from the data input device via the earphone/microphone port; and
a device interface extension of the software platform configured to extract data from the modulated data signal in response to the device discriminator extension determining the connected device is the data input device,
wherein:
the data input device transmits data along a same circuit path as an earphone/microphone unit, and
the mobile electronic device uses a single interface to extract the modulated data signal and to extract an earphone/microphone signal.

16. The apparatus of claim 15, wherein the device discriminator extension is further configured to disable a built-in input device of the mobile electronic device in response to the device discriminator extension determining the connected device is a data input device.

17. The apparatus of claim 15, wherein the device interface extension is further programmed to provide the extracted data to an application being executed by the processor unit.

18. The apparatus of claim 15, wherein the processor unit comprises a digital signal processor component.

19. The apparatus of claim 15, wherein the data input device is a keyboard.

20. The apparatus of claim 15, wherein the modulated data signal is modulated using an ON/OFF keying (OOK) modulation scheme.

21. The apparatus of claim 15, wherein the modulated data signal is modulated using an M-ary modulation scheme wherein each symbol defined in the modulation scheme represents a unique alphanumeric character.

22. The apparatus of claim 15, wherein the mobile electronic device comprises a wireless telephone.

23. An apparatus for receiving data in a mobile electronic device from an external data input device via an earphone/microphone port, the apparatus comprising:

means for automatically determining the external data input device is to be used for data input with a device discriminator extension of a software platform of the mobile electronic device;

means for receiving a modulated data signal from the data input device via the earphone/microphone port using the device discriminator extension; and means for extracting data from the modulated data signal with a device interface extension of the software platform of the mobile electronic device in response to the device discriminator extension determining the connected device is the data input device, wherein:

the data input device transmits data along a same circuit path as an earphone/microphone unit, and the mobile electronic device uses a single interface to extract the modulated data signal and to extract an earphone/microphone signal.

24. The apparatus of claim 23, further comprising means for determining whether a device connected to the earphone/microphone port is a data input device using the device discriminator extension.

25. The apparatus of claim 24, further comprising means for disabling an input device of the mobile electronic device in response to determining the connected device is a data input device using the device discriminator extension.

26. The apparatus of claim 23, further comprising means for providing the extracted data to an application being executed on the mobile electronic device using the device interface extension.

27. The apparatus of claim 23, wherein data input device comprises a keyboard and the mobile electronic device comprises a wireless telephone.

28. The apparatus of claim 23, wherein the modulated data signal is modulated using an M-ary modulation scheme wherein each symbol defined in the modulation scheme represents a unique alphanumeric character.

29. A system for receiving data in a mobile electronic device from an external data input device via an earphone/microphone port of the mobile electronic device, the system comprising:

a device discrimination component extension of a software platform of the mobile electronic device configured to automatically determine whether a device connected to the earphone/microphone port is a data input device; and a device interface extension of the software platform of the mobile electronic device configured to extract data from the modulated data signal in response to the device discriminator extension determining the connected device is the data input device, wherein:

the data input device transmits data along a same circuit path as an earphone/microphone unit, and the mobile electronic device uses a single interface to extract the modulated data signal and to extract an earphone/microphone signal.

30. The system of claim 29, wherein the device discrimination extension is further to disable a built-in input device of the mobile electronic device in response to determining the connected device is a data input device.

31. The system of claim 29, wherein the device interface extension is further configured to provide the extracted data to an application being executed on the mobile electronic device.

32. The system of claim 29, wherein the modulated data signal is modulated using an M-ary modulation scheme wherein each symbol defined in the modulation scheme represents a unique alphanumeric character.

33. The system of claim 29, wherein the mobile electronic device comprises a wireless telephone and the data input device comprises a keyboard.

34. A non-transitory machine readable storage medium having machine-executable components for execution on a mobile electronic device with an earphone/microphone port, comprising:

a device discrimination extension of a software platform of the mobile electronic device configured to automatically determine whether a device connected to the earphone/microphone port is a data input device; and a device interface extension of the software platform of the mobile electronic device configured to extract data from the modulated data signal in response to the device discriminator extension determining the connected device is the data input device, wherein:

the data input device transmits data along a same circuit path as an earphone/microphone unit, and the mobile electronic device uses a single interface to extract the modulated data signal and to extract an earphone/microphone signal.

35. The non-transitory machine readable storage medium of claim 34, wherein the device discrimination extension is further configured to disable an input device of the mobile electronic device in response to determining the connected device is a data input device.

36. The non-transitory machine readable storage medium of claim 34, wherein the device interface extension is further configured to provide the extracted data to an application being executed on the mobile electronic device.

37. The non-transitory machine readable storage medium of claim 34, wherein the modulated data signal is modulated using an M-ary modulation scheme wherein each symbol defined in the modulation scheme represents a unique alphanumeric character.

38. The non-transitory machine readable storage medium of claim 34, wherein the mobile electronic device comprises a wireless telephone and the data input device comprises a keyboard.

* * * * *